(12) United States Patent
Farrell et al.

(10) Patent No.: US 8,905,626 B2
(45) Date of Patent: Dec. 9, 2014

(54) COMMERCIAL FROZEN FOOD PREPARATION APPARATUS

(75) Inventors: James J. Farrell, Orinda, CA (US); Jens Peter Voges, Tiburon, CA (US); Kathleen Ann Scheible, San Francisco, CA (US)

(73) Assignee: f'real foods, LLC, Orinda, CA (US)

( * ) Notice: Subject to any disclaimer, the term of this patent is extended or adjusted under 35 U.S.C. 154(b) by 1034 days.

(21) Appl. No.: 12/902,252

(22) Filed: Oct. 12, 2010

(65) Prior Publication Data

US 2011/0090756 A1 Apr. 21, 2011

Related U.S. Application Data

(60) Provisional application No. 61/252,606, filed on Oct. 16, 2009.

(51) Int. Cl.
| | | |
|---|---|---|
| B01F 15/00 | (2006.01) | |
| B01F 7/16 | (2006.01) | |
| A23G 9/04 | (2006.01) | |
| A23G 9/20 | (2006.01) | |
| A23G 9/28 | (2006.01) | |
| B08B 3/02 | (2006.01) | |
| B08B 9/00 | (2006.01) | |

(52) U.S. Cl.
CPC ............. *B01F 7/1605* (2013.01); *A23G 9/045* (2013.01); *A23G 9/20* (2013.01); *A23G 9/28* (2013.01); *B08B 3/02* (2013.01); *B08B 9/00* (2013.01)
USPC ........................................... 366/138

(58) Field of Classification Search
CPC ........ A23G 9/045; B01F 7/1605; B08B 3/02; B08B 9/00
USPC ............ 366/347, 207, 348, 249, 138; 99/293, 99/323.1
See application file for complete search history.

(56) References Cited

U.S. PATENT DOCUMENTS

| 37,046 A | 12/1862 | Mackey |
|---|---|---|
| 496,674 A | 5/1893 | Urbach |

(Continued)

FOREIGN PATENT DOCUMENTS

| CA | 804966 | 1/1968 |
|---|---|---|
| DE | 2158002 | 5/1973 |

(Continued)

OTHER PUBLICATIONS

Starfishfelix, Best Selling Milkshake Makers, as viewed Jun. 8, 2011 and published at http://hubpages.com/hub/Best-Selling-Milkshake-Makers.

(Continued)

*Primary Examiner* — Tony G Soohoo
(74) *Attorney, Agent, or Firm* — Sideman & Bancroft LLP; Guy W. Chambers

(57) ABSTRACT

A machine prepares semi frozen food products and/or beverages from pre-prepared (e.g. frozen) cups. A user chooses the desired frozen cup, inserts it into the machine, chooses how they would like it prepared from a range of thickness options, and the machine then opens a sealed chamber door and inserts the product upward into the chamber and prepares the product by blending it in the cup. Upon removal of the product and resealing of the chamber door, the cleaning mechanisms provide thorough cleaning of all food contact surfaces and the chamber interior. Automatic high temperature steam sanitation takes place in the chamber if the machine is not used for an extended period of time, thus greatly reducing or eliminating the need for manual cleansing and sanitation by an attendant and ensuring healthy food preparation at all times.

31 Claims, 17 Drawing Sheets

(56) References Cited

U.S. PATENT DOCUMENTS

| | | | |
|---|---|---|---|
| 934,537 A | 9/1909 | Johnson | |
| 1,313,830 A | 8/1919 | Minsk | |
| 1,592,788 A | 7/1926 | Supervielle | |
| 2,026,240 A | 12/1935 | Luxmore | |
| 2,072,691 A | 3/1937 | Stark | |
| 2,115,809 A | 5/1938 | Goldman | |
| 2,123,496 A | 7/1938 | Briggs | |
| 2,440,425 A | 4/1948 | williams | |
| 2,462,497 A | 2/1949 | Heyman | |
| 2,501,887 A * | 3/1950 | Cress | 134/148 |
| 2,701,131 A | 2/1955 | Love | |
| 2,898,094 A | 8/1959 | O'Neill | |
| 2,941,885 A | 6/1960 | Tomlinson | |
| 2,967,433 A | 6/1960 | Phillips | |
| 3,154,123 A | 10/1964 | Tomlinson | |
| 3,171,635 A | 3/1965 | Haentjens | |
| 3,295,997 A | 1/1967 | Tomlinson | |
| 3,362,575 A | 1/1968 | Fotos | |
| 3,503,757 A | 3/1970 | Rubenstein | |
| 3,514,080 A | 5/1970 | Price | |
| 3,653,575 A | 4/1972 | Schrepper | |
| 3,738,619 A | 6/1973 | Shirae | |
| 3,934,725 A | 1/1976 | Edwards | |
| 4,169,681 A | 10/1979 | Kato | |
| 4,233,325 A | 11/1980 | Slangan | |
| 4,297,379 A | 10/1981 | Topalian | |
| 4,346,815 A | 8/1982 | raymor | |
| 4,358,298 A | 11/1982 | Ratcliff | |
| 4,388,356 A | 6/1983 | Hrivnak et al. | |
| 4,431,682 A | 2/1984 | Smith | |
| 4,434,186 A | 2/1984 | Desia | |
| 4,542,035 A | 9/1985 | Huang | |
| 4,544,277 A | 10/1985 | Schnellmann | |
| 4,547,076 A | 10/1985 | Maurer | |
| 4,548,054 A * | 10/1985 | Levine | 62/342 |
| 4,549,811 A | 10/1985 | Schiffner | |
| 4,551,026 A | 11/1985 | Cristante | |
| 4,588,136 A | 5/1986 | homma | |
| 4,609,561 A | 9/1986 | Wade | |
| 4,637,221 A * | 1/1987 | Levine | 62/342 |
| 4,708,487 A | 11/1987 | Marshall | |
| 4,708,489 A * | 11/1987 | Carlson | 366/149 |
| 4,740,088 A | 4/1988 | Kelly | |
| 4,818,554 A | 4/1989 | Giddey | |
| 4,821,906 A | 4/1989 | clark | |
| 4,830,868 A | 5/1989 | Wade | |
| 4,988,529 A | 1/1991 | Nakaya | |
| 5,000,974 A | 3/1991 | Albersmann | |
| 5,040,698 A | 8/1991 | Ramsey | |
| 5,112,626 A | 5/1992 | Huang | |
| 5,150,967 A | 9/1992 | Neilson | |
| 5,178,351 A | 1/1993 | Lesage | |
| 5,186,350 A | 2/1993 | McBride | |
| 5,328,263 A | 7/1994 | Neilson | |
| 5,389,443 A | 2/1995 | Banerjee et al. | |
| 5,439,289 A | 8/1995 | Neilson | |
| 5,442,997 A * | 8/1995 | Branz et al. | 99/330 |
| 5,465,891 A | 11/1995 | Bridges | |
| 5,474,206 A | 12/1995 | Herring | |
| 5,580,007 A | 12/1996 | Caviezel | |
| 5,593,712 A | 1/1997 | Poilane | |
| 5,599,103 A | 2/1997 | Linscott | |
| 5,653,157 A | 8/1997 | Miller | |
| 5,657,927 A | 8/1997 | Bushman et al. | |
| 5,669,288 A | 9/1997 | Zittel | |
| 5,758,571 A * | 6/1998 | Kateman et al. | 99/455 |
| 5,782,985 A | 7/1998 | manser | |
| 5,803,377 A | 9/1998 | Farrell | |
| 5,962,060 A | 10/1999 | Farrell | |
| 6,041,961 A | 3/2000 | Farrell | |
| 6,071,006 A | 6/2000 | Hochstein | |
| 6,135,169 A | 10/2000 | Sandei et al. | |
| 6,293,691 B1 | 9/2001 | Rebordosa | |
| 6,326,047 B1 | 12/2001 | Farrell | |
| 6,465,034 B2 | 10/2002 | Farrell | |
| 6,474,862 B2 | 11/2002 | Farrell | |
| 6,527,207 B1 | 3/2003 | Farrell | |
| 6,609,431 B1 | 8/2003 | Tietsworth et al. | |
| 6,986,263 B2 | 1/2006 | Crisp, III | |
| 7,144,150 B2 | 12/2006 | Farrell | |
| 7,351,385 B1 | 4/2008 | Batten et al. | |
| 7,473,026 B2 | 1/2009 | Clawson | |
| 7,520,658 B2 * | 4/2009 | Farrell | 366/197 |
| 7,520,662 B2 * | 4/2009 | Farrell | 366/347 |
| 2002/0015355 A1 | 2/2002 | Sampei et al. | |
| 2003/0071060 A1 | 4/2003 | Haskayne et al. | |
| 2004/0149142 A1 | 8/2004 | Groll | |
| 2005/0174884 A1* | 8/2005 | Farrell | 366/347 |
| 2005/0193896 A1 | 9/2005 | McGill | |
| 2005/0193901 A1 | 9/2005 | Buehler | |
| 2005/0201198 A1* | 9/2005 | Farrell | 366/138 |
| 2005/0254341 A1 | 11/2005 | Gerling et al. | |
| 2006/0077756 A1 | 4/2006 | Farrell | |
| 2008/0164274 A1 | 7/2008 | Stettes | |
| 2008/0210697 A1 | 9/2008 | Kessell et al. | |
| 2009/0178579 A1 | 7/2009 | Heiser | |
| 2009/0291174 A1 | 11/2009 | Lewis | |
| 2011/0088558 A1* | 4/2011 | Farrell et al. | 99/275 |
| 2011/0088568 A1* | 4/2011 | Farrell et al. | 99/460 |
| 2011/0090756 A1* | 4/2011 | Farrell et al. | 366/138 |
| 2013/0341439 A1* | 12/2013 | Farrell et al. | 241/27 |
| 2013/0341446 A1* | 12/2013 | Farrell et al. | 241/100 |
| 2013/0343150 A1* | 12/2013 | Farrell et al. | 366/344 |
| 2013/0344221 A1* | 12/2013 | Farrell et al. | 426/590 |

FOREIGN PATENT DOCUMENTS

| | | |
|---|---|---|
| DE | 2509583 | 9/1975 |
| DE | 3935548 | 5/1991 |
| EP | 91825 | 10/1983 |
| EP | 1022054 | 9/2003 |
| GB | 492940 | 9/1938 |
| GB | 733645 | 7/1995 |
| WO | WO2009041836 | 2/2009 |
| WO | WO2009027131 | 3/2009 |
| WO | WO2009041835 | 4/2009 |
| WO | WO2010064042 | 6/2010 |

OTHER PUBLICATIONS

Image of Six Vane Cup Design, sold by F'real Foods, LLC. 1999.
International Search report from PCT/US2010/52241, dated Dec. 14, 2010, 3 pages.
International Search report from PCT/US2010/52240, dated Feb. 9, 2011, 3 pages.
European Search report from PCT/US2009/063171, dated Jan. 26, 2012, 3 pages.
International Search report from PCT/US2010/52234, dated Mar. 5, 2012, 3 pages.

* cited by examiner

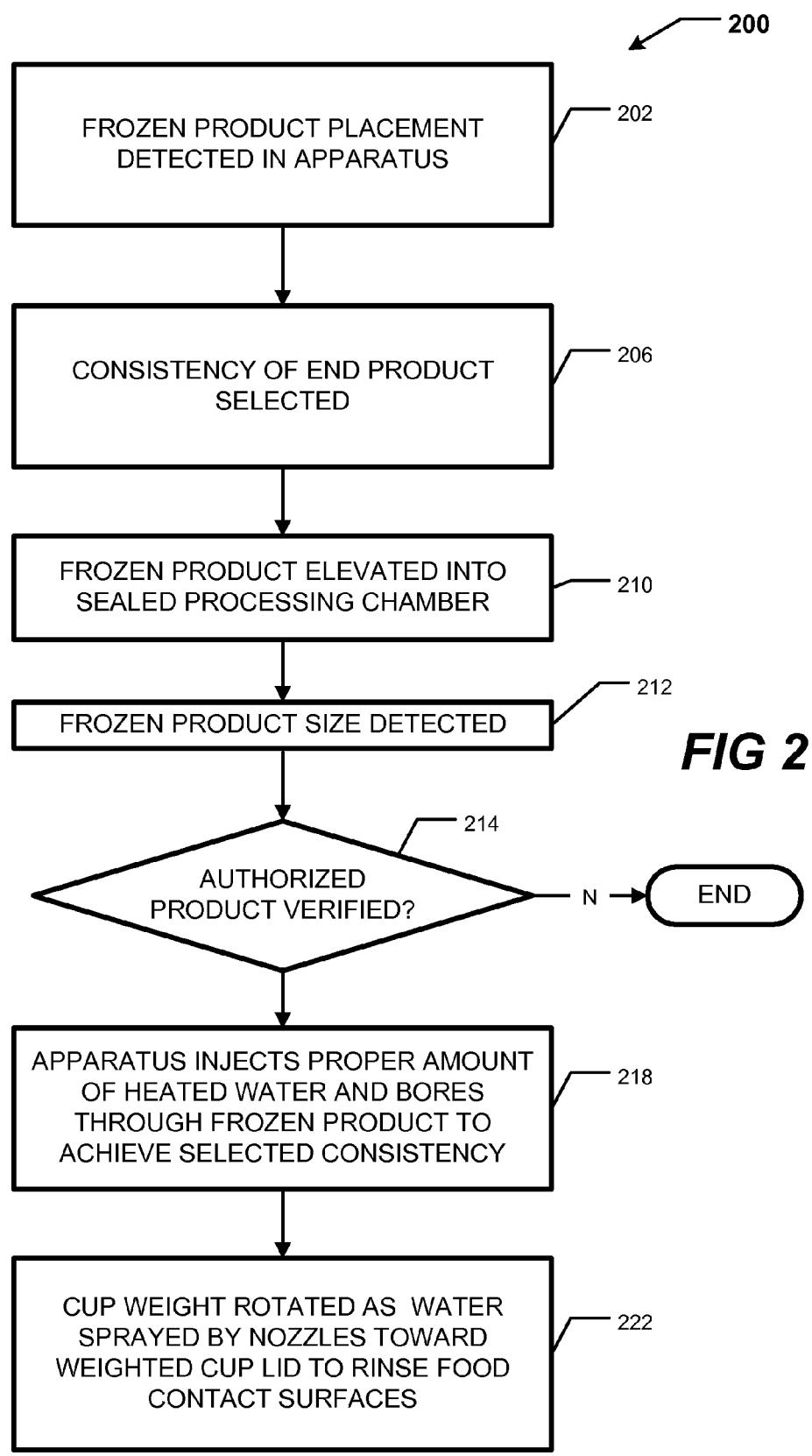

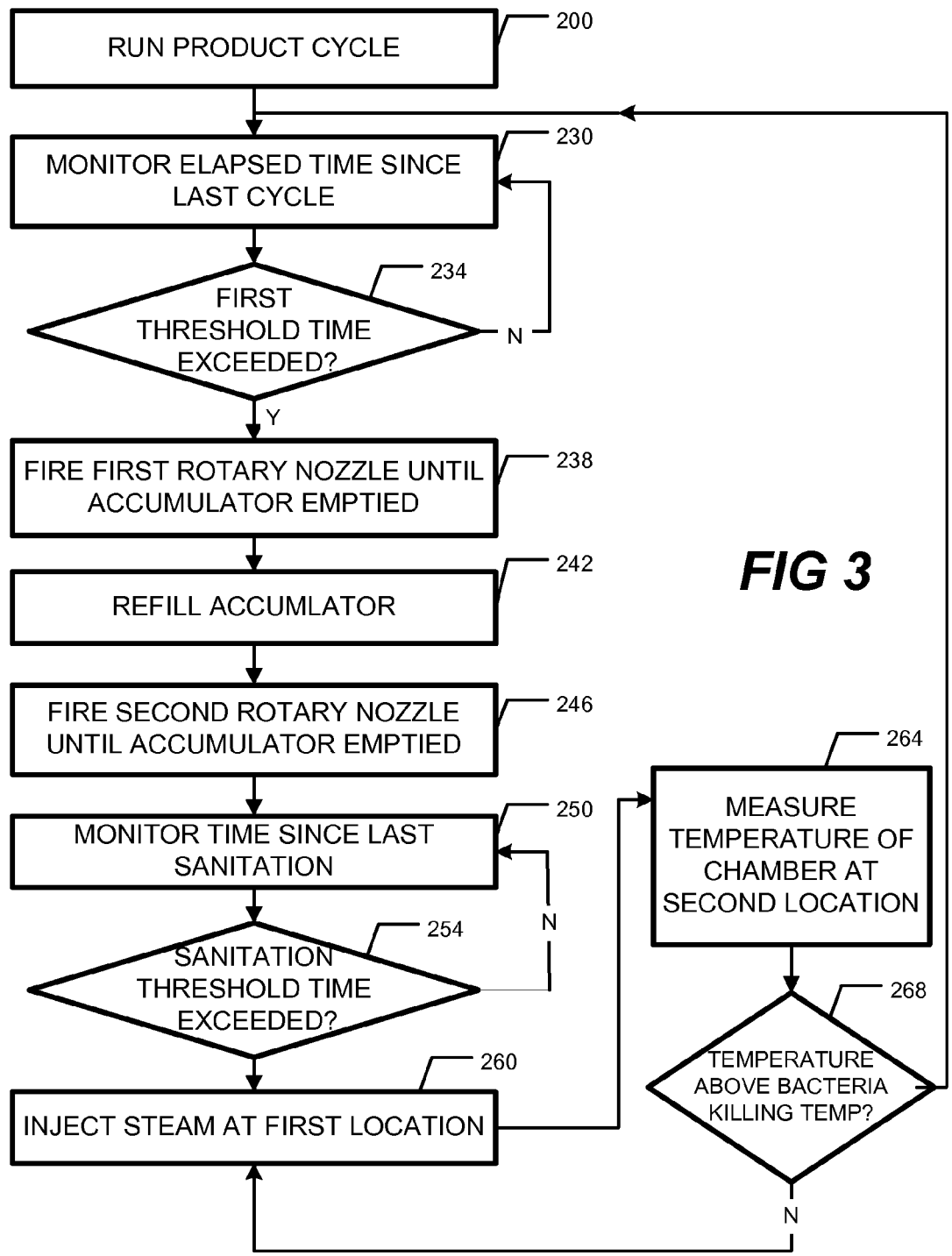

WATER TRAJECTORY 151 FROM SCOUR NOZZLE 330D

US 8,905,626 B2

COMMERCIAL FROZEN FOOD PREPARATION APPARATUS

CROSS REFERENCE TO RELATED APPLICATIONS

This application claims benefit of U.S. Provisional Patent Application No. 61/252,606, entitled "COMMERCIAL FROZEN FOOD PREPARATION APPARATUS," filed on Oct. 16, 2009, which is hereby incorporated by reference in the entirety. This application is also related to applications entitled: "COMMERCIAL FROZEN FOOD PREPARATION APPARATUS SANITATION," and "COMMERCIAL FROZEN FOOD PREPARATION APPARATUS ELECTRONICS" filed concurrently with the present application and also claiming the benefit of U.S. Provisional Patent Application No. 61/252,606, each of which is also hereby incorporated by reference in the entirety into this application.

BACKGROUND OF THE INVENTION

This invention relates generally to food preparation and more specifically to instant preparation of frozen solids by blending in cups or similar vessels.

Milkshakes and other beverages or foods are a desirable offering for convenience stores or other retail formats. An apparatus in a convenience store that serves on-the-go consumers prepares a beverage, e.g. a milkshake, by blending the ingredients in a cup containing the frozen ingredients. A consumer may directly choose the type or flavor to be prepared and insert it into the apparatus, which with the press of a button will then provide the finished product, e.g. the blended milkshake, at the desired consistency, to the consumer.

While it is desirable to minimize or eliminate the time and attention of an employee in running and servicing the apparatus, this generates its own set of concerns.

SUMMARY

A machine prepares semi frozen food products and/or beverages from pre-prepared (e.g. frozen) cups. A user chooses the desired cup, inserts it into the machine, chooses how they would like it prepared from a range of thickness options, and the machine then opens a sealed chamber door and inserts the product upward into the chamber and prepares the product by blending it in the cup. Upon removal of the product and resealing of the chamber door, the cleaning mechanisms provide thorough rinsing of all food contact surfaces and the chamber interior. Automatic high pressure rinsing, subsequent cleaning, and high temperature steam sanitation takes place in the chamber at defined intervals, thus substantially reducing or even eliminating the need for manual cleansing and sanitation by an attendant and ensuring healthy food preparation at all times.

BRIEF DESCRIPTION OF THE DRAWINGS

FIG. 2 is a flow chart illustrating a product cycle according to a disclosed embodiment.

FIG. 3 is a flowchart illustrating operating of apparatus 100 according to a process incorporating the product cycle illustrated in FIG. 2.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

While the embodiments described below relate to preparation of a frozen milkshake, other frozen beverages or food are encompassed and may be prepared by the described embodiments and appended claims.

Figure 1A:
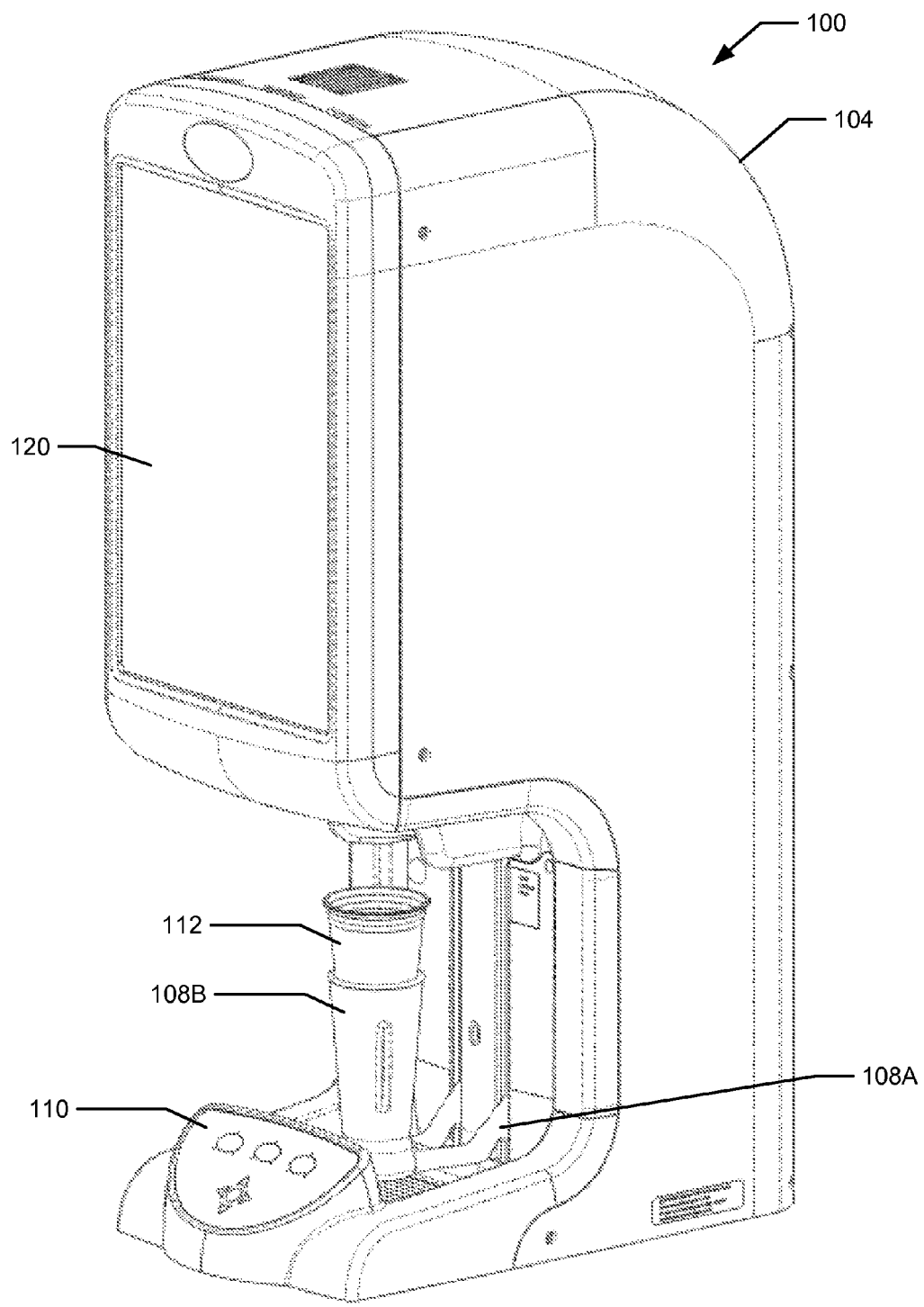
FIG. 1A is a perspective view of apparatus 100 in an initial "cup down" position.
Figure 1B:
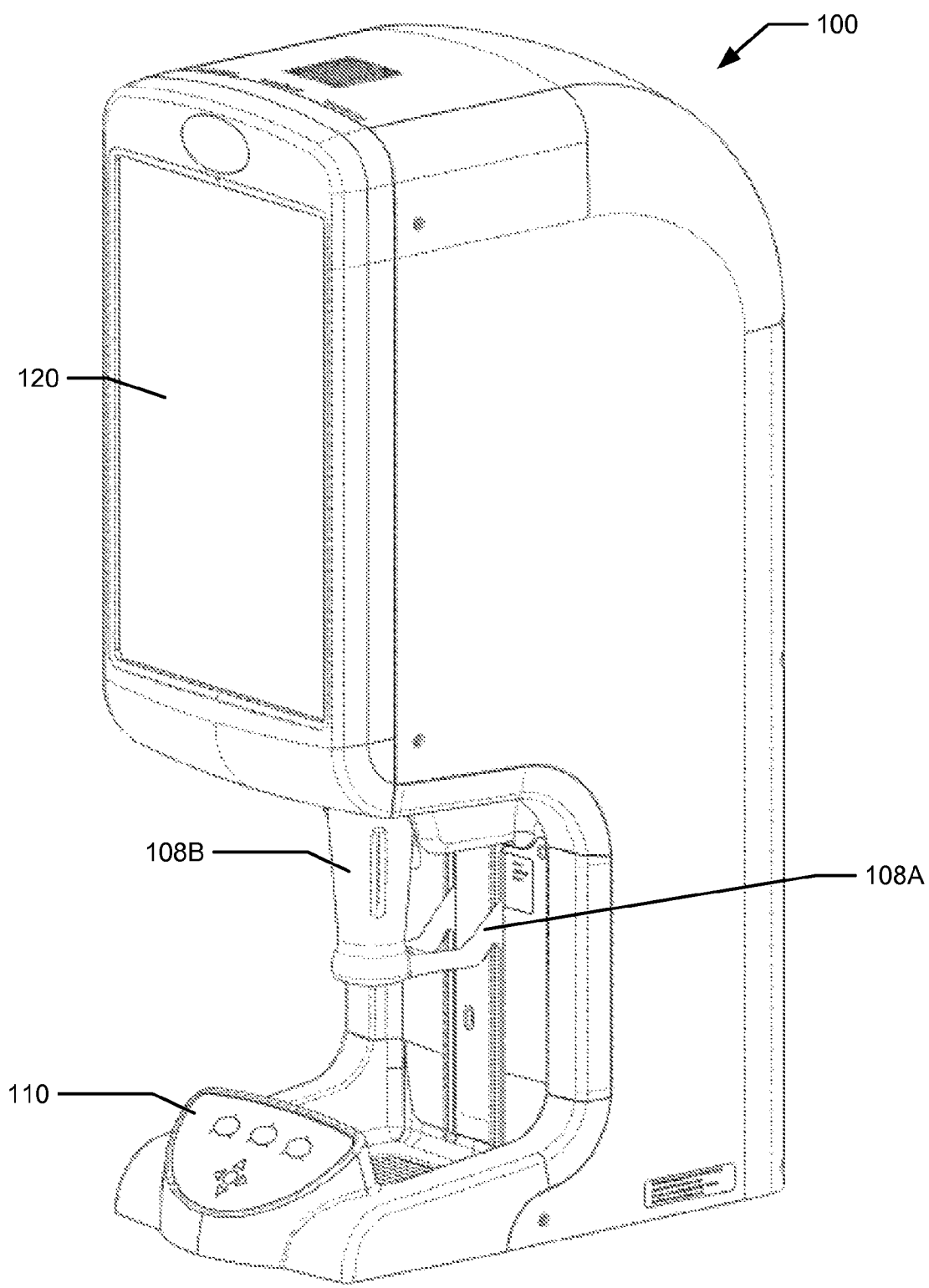
FIG. 1B is another perspective view of apparatus 100 in a subsequent "cup up" position.

FIG. 1A is a perspective view of apparatus 100 in an initial "cup down" position, and FIG. 1B is another perspective view of apparatus 100 in a subsequent "cup up" position. Apparatus 100 will prepare the frozen ingredients in cup 112 for consumption by a user. User interface 120 comprises a large video screen 120 which conveys information including product availability and features. A microprocessor (not shown) controls the operation of the various components of apparatus 100, including the video screen. In certain embodiments, a user may select a desired consistency level of a milkshake, for example, regular, less thick or more thick by pushing a push button on the control panel 110. In other embodiments, such function can be incorporated into the user interface screen 120 as a touchscreen. A cup carriage 108 comprises carriage arms 108A and cup holder 108B, that travels in a vertical direction along guide rail or track (not shown). Various components within housing 104 of apparatus 100 will be described in relation to the flow charts of FIGS. 2 and 3 illustrating aspects of operation of apparatus 100, which should be viewed in conjunction with FIGS. 4A-8C.

Product preparation cycle 200 is initiated by a user through the control panel 110 push buttons or the touch screen of user interface 120 after the user has placed the frozen cup in the cup holder. In initiating the cycle, the user may select the desired consistency, as represented by step 206. In step 202, apparatus 100 detects the placement of the product cup in the cup holder. As seen in FIG. 4C, the placement or presence of the cup 112 in the holder is detected when cup sensing beam 155 is interrupted. Cup sensing beam is generated by transmitter 160 and received by receiver 154. When the beam is interrupted, a cup is determined to be present in the cup holder. While in some embodiments the location of the transmitter and receiver may be the opposite of that shown in FIG. 4C, the receiver is preferably at the upper location as it is partially shielded from ambient light by housing 104. This is advantageous because in some lighting conditions false cup present detection may occur and this is thus avoided with the transmitter/receiver layout and geometry shown in FIG. 4C.

After the cup has been detected and the cycle initiated, the cup will then be elevated up into the sealed chamber in step 210 so that the frozen contents may be bored while warm water is injected into the cup. Prior to blending, the cup size will be sensed in step 212. The carriage is moved up and down by a position motor 172 and a toothed belt system. An encoder 176 on position motor 172 is used to determine the position of the carriage 108A and cup holder 108B. This position, together with cup size sensors 164A and 164B, shown in FIG. 4D, is used to determine the cup size. One of sensors 164A is a transmitter while the other is a receiver. When a through beam travelling from transmitter to receiver is interrupted, a cup is detected. A larger and thus taller cup will extend higher up from the cup holder 108B/carriage 108A and thus interrupt the through beam sensors 164A and 164B before a shorter cup. The boring time and/or amount or temperature of water may be varied with cup size to arrive at the desired consistency.

The cup height may also be used to determine if an appropriate or authorized product is in the cup holder. If the height does not match a predetermined authorized height the cycle may be aborted or the user may be notified of such an error via the touch screen. Alternatively an RFID chip or a bar code or some other unique markings or image on the cup may be scanned to determine cup size and/or authorization.

Figure 5A:
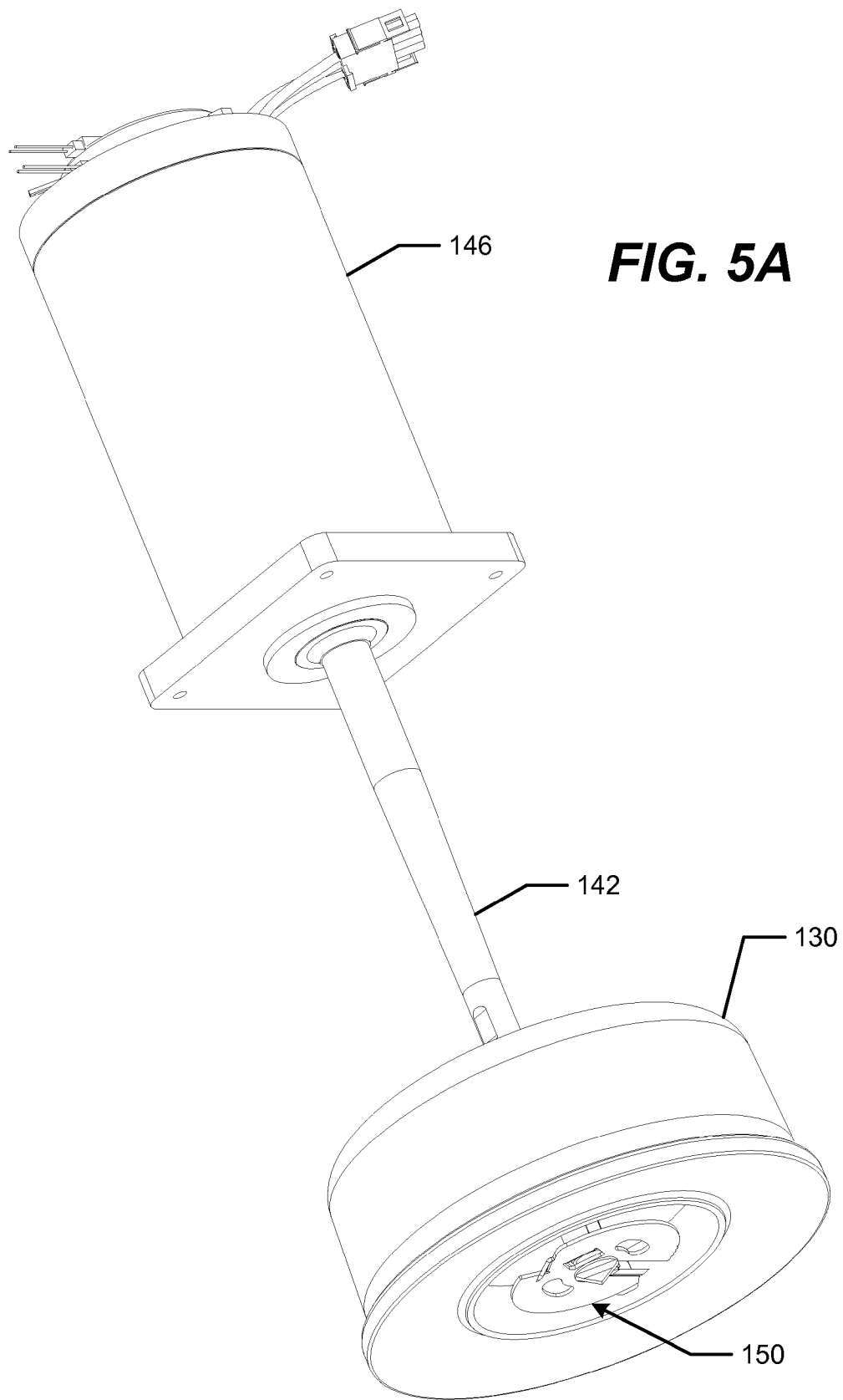
FIGS. 5A-7B illustrate different views and aspects of components of apparatus 100.
Figure 5B:
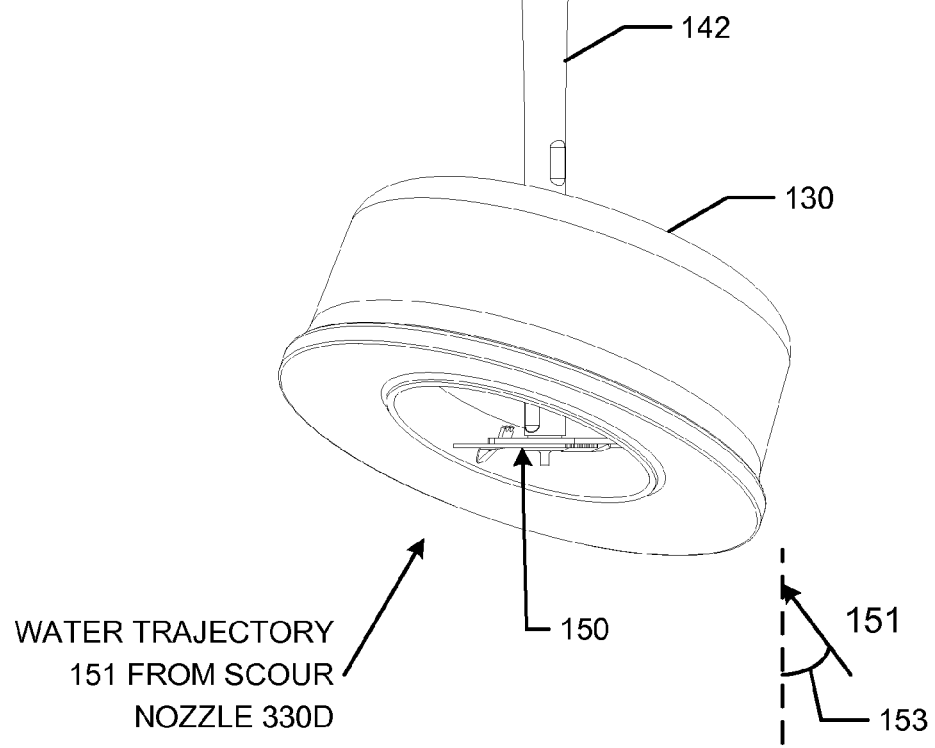

Such authorization/verification also prevents damage to the apparatus and ensures the safety of the user because an odd object may easily be destroyed by boring blade 150 shown in FIG. 5A (which will be described later) and result in potential damage to the apparatus or injury to those nearby.

Figure 4A:
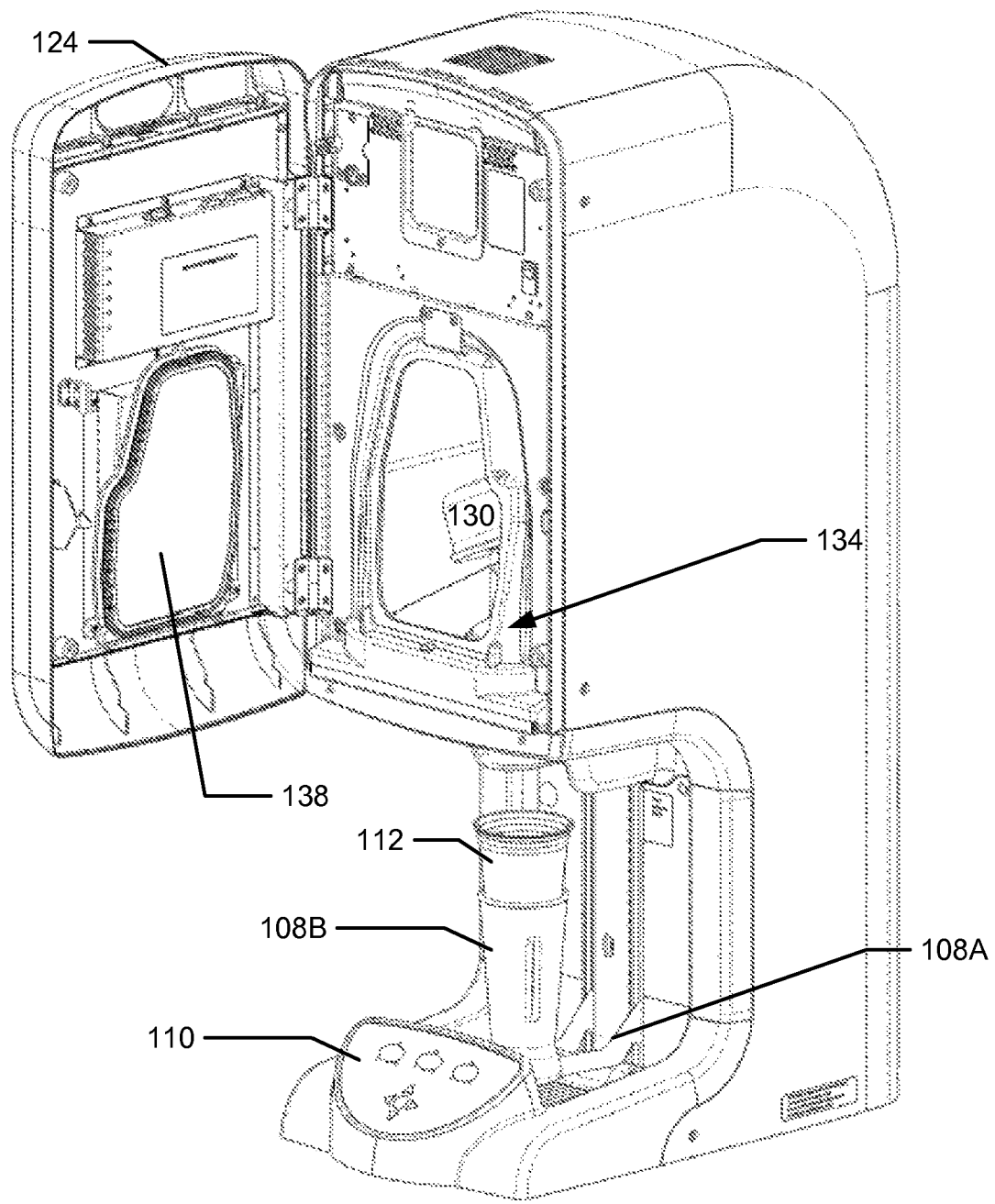
FIGS. 4A-4E illustrate differing views and aspects of apparatus 100.
Figure 4B:
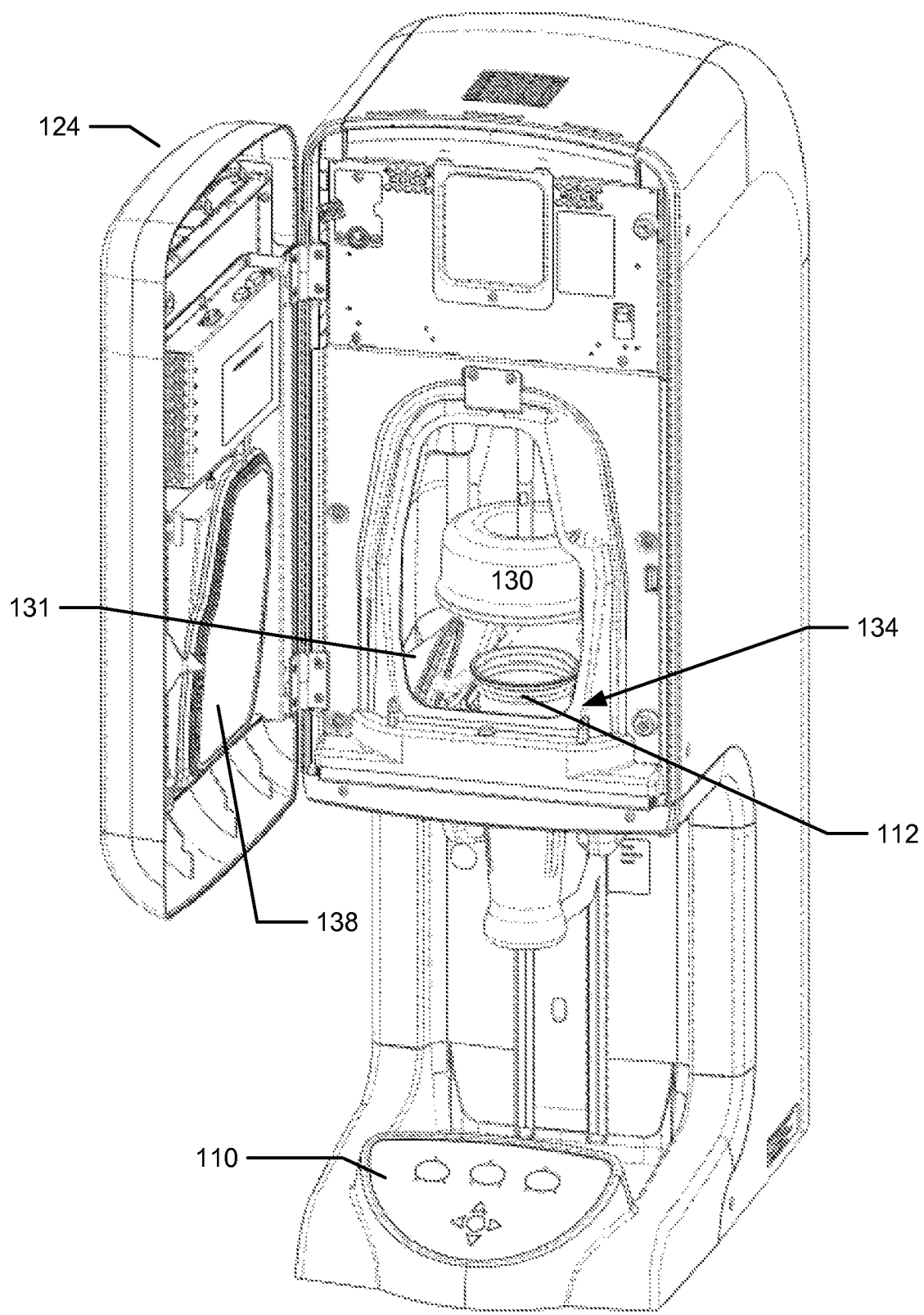
Figure 4C:
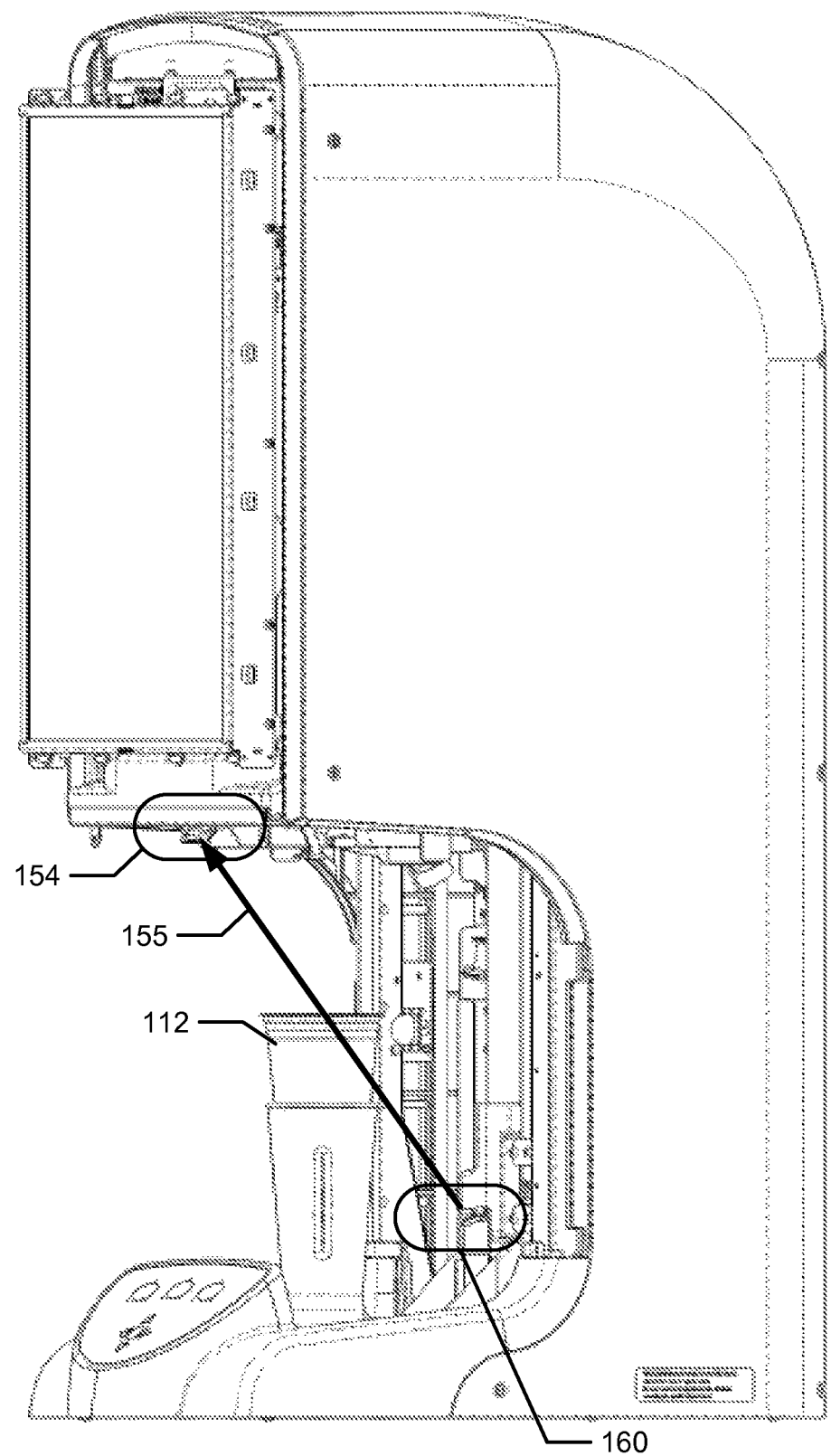
Figure 4D:
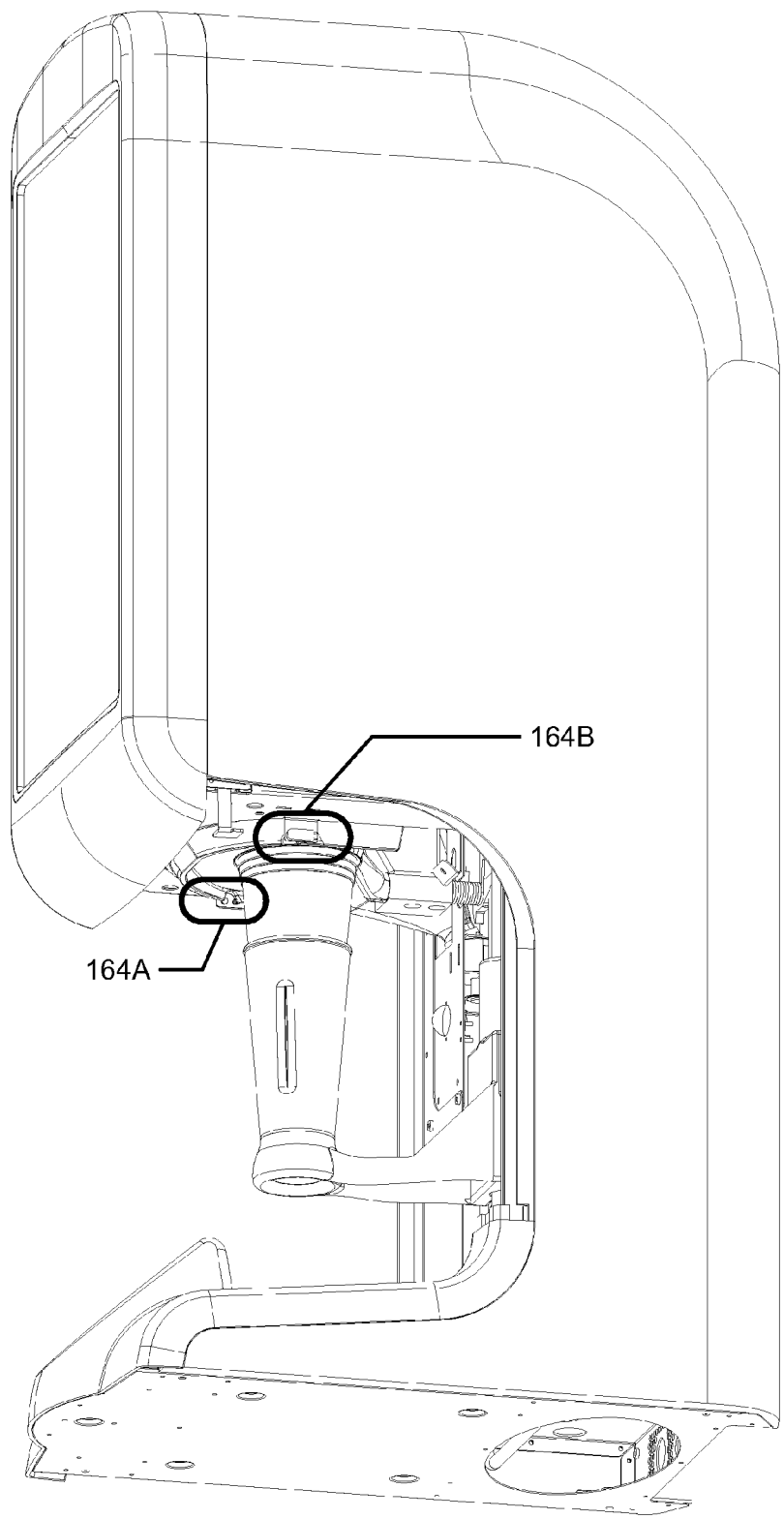
Figure 4E:
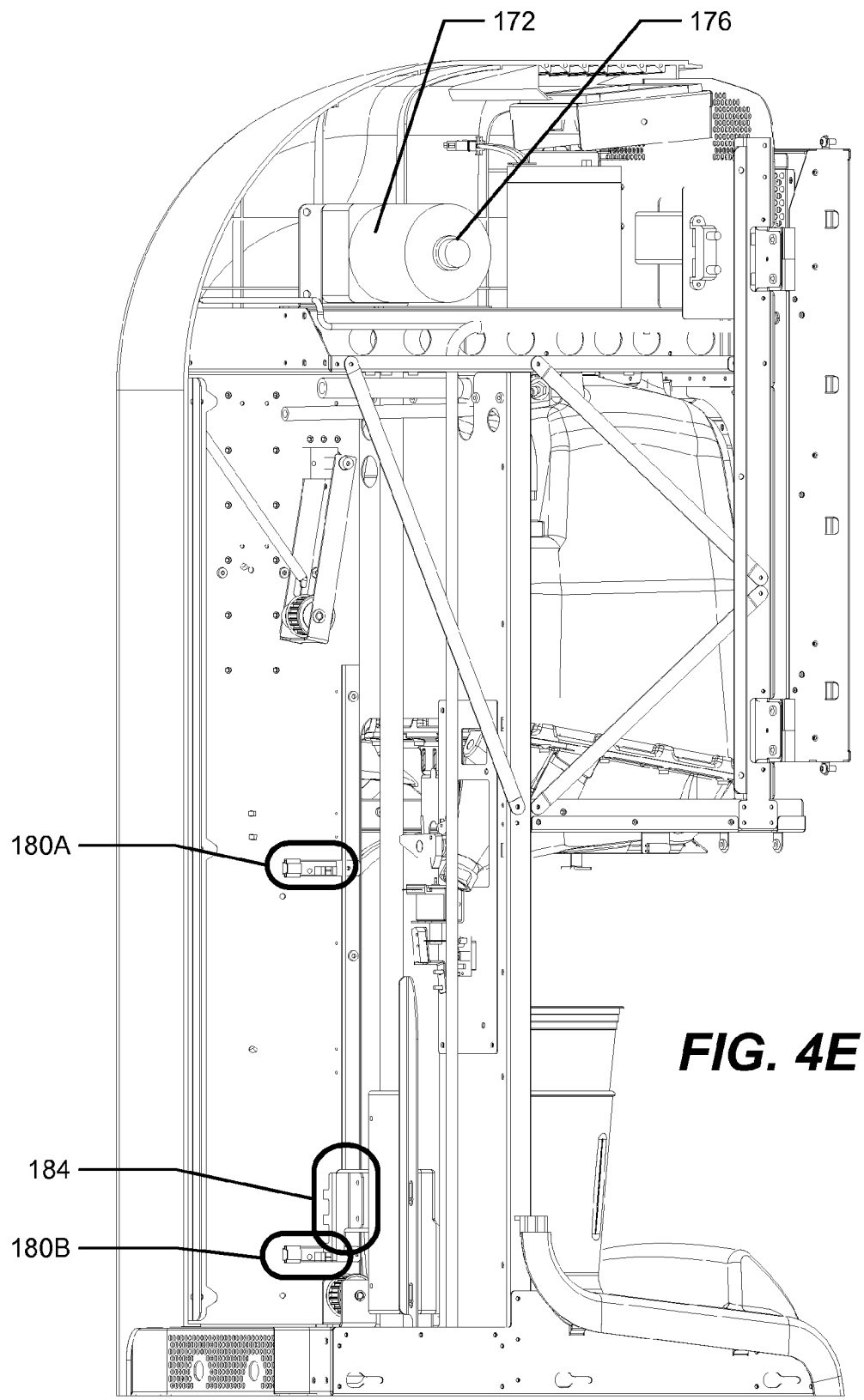

In the embodiment shown in FIG. 4E, the position as determined by the position motor 172 and encoder 176 is redundantly verified. This is beneficial because the position motor moves the carriage via a toothed belt. If the belt slips or skips a position on the belt, the position motor and encoder may indicate an erroneous position, which is undesirable and potentially dangerous. For example, if the cup is not in the raised position (appropriate for each size of cup) so that the cup lid weight is not resting upon the top of the cup, but is instead resting on the support pins of the drive shaft, the cup lid weight may spin at several hundred RPM as the product is bored and create severe vibration (similar to an unbalanced washing machine) due to the unbalanced lid weight. Additionally, the cup will not be properly held by the carriage and may potentially rotate in a dangerous fashion. The position is verified by upper sensor 180A and lower sensor 180B to sense the position of flag 184 of the carriage as it translates up and down. In one embodiment, sensors 180A and 180B are through beam sensors and when the beam is blocked by the flag of the carriage it is known that the carriage is between an emitter and collector of the through beam sensor. Alternatively sensors 180A and 180B may have one dual purpose emitter/collector on one side of the flag, and when the signal is reflected by the flag the carriage is detected at the location of the sensor. In a third embodiment, sensors 180A and 180B can be simple switches contacted and tripped by the flag.

In step 218, the apparatus injects the proper amount of heated water and bores through the frozen product to achieve the selected consistency. After the product is lowered, the cup lid weight 130, which will be described later in more detail with regard to FIGS. 5-7, is rotated as heated water is sprayed by nozzles 330C and 330D, as shown in FIG. 8C, above and below the cup weight at opposite sides of the cup weight to clean all of the food contact surfaces. Thus, as part of each product cycle 200, the food contact surfaces (e.g. blade 150 and cup lid weight 130 in the illustrative embodiments) are cleaned so as to remove product after each milkshake is prepared. Note that the nozzles cannot be in the trajectory of the cup as it travels vertically in the sealed chamber, and thus cannot be directly under the blade 150, which complicates the cleaning process, as will be discussed in greater detail below.

In prior devices, a clerk was required from time to time to clean the blade and other food contact surfaces with a brush. Also, a sanitizing solution was utilized to occasionally sanitize the device.

Embodiments functioning in accordance with the flow chart of FIG. 3 and as depicted in the associated figures eliminate the need for regular human intervention and for stocking a sanitizer that needs to be replaced, which is advantageous for installations where such milkshakes and other frozen beverages are made, such as convenience stores.

As seen in FIG. 3, after each product cycle 200 previously described with regard to FIG. 2, in step 230 the elapsed time since the last product cycle completion is monitored. If a threshold time is not exceeded, monitoring will continue. If on the other hand, as seen in step 234, the threshold time has been met or exceeded, in step 238 a first rotary nozzle will be fired with a short burst of water pumped from an accumulator reservoir. The threshold is on the order of 10-60 minutes and in one example is 15 minutes. The first rotary nozzle may be either of front rotary nozzle 330A or rear rotary nozzle 330B seen in FIGS. 8A-8C. It is desirable to dispense a very high flow rate of water, greater than 3 gallons per minute, for example 4 gallons per minute, for a short time, for some 1-5 seconds, e.g. about 1.5 seconds from each rotary nozzle firing. While the rotary nozzles are capable of dispensing a large quantity of water in a short time, sufficient volume of water at sufficient pressure is typically unavailable at the blender's water supply input 300 due to restrictions and filters on the supply line upstream of the apparatus. Therefore an accumulator tank 304 and a rotary pump 308 are used to increase the supply and pressure of water for the rotary nozzles to function more effectively. The increase in water pressure over input pressure is approximately 50-100 p.s.i., allowing for both a large flow in a short period and for high pressure rinsing. While accumulators are typically used at the output side of a pump, accumulator 304 is located at the input to pump 308 in certain embodiments, although in other embodiments it may be at the output. This placement of the accumulator before the pump eliminates the susceptibility of the system to loss of pressure by the accumulator pressure bladder. In this embodiment, the accumulator is simply serving as an inexpensive and readily available reservoir from which the pump can pump water at a high rate until the accumulator is exhausted. When the pump is turned off, the accumulator is refilled with water at a slower rate by the pressure of the water supply line. In this manner, the accumulator is never relied upon to provide pressure to push water through the rotary nozzles. The more typical arrangement with an accumulator is to have the accumulator's bladder pressurized so that when water is to be released from the accumulator by opening a valve downstream, the pressurized bladder pushes the water out. The valve is then closed and the accumulator is then recharged by a pump that is located upstream of the accumulator.

Returning to FIG. 3, accumulator 304 is refilled in step 242 and then the second rotary nozzle, e.g. 330A or 330B, is fired (by a valve of manifold 316 under control of a system microprocessor) with a short burst of water pumped from the accumulator reservoir. Then in step 250, the time since the last sanitation is monitored and if a threshold time since the last sanitation is met or exceeded, as seen in step 254, steam is injected at a first location 330E of FIG. 8B in step 260. The sanitation time threshold may vary from approximately one hour to several days, but is preferably 24 hours and preferably is controlled to occur at night time when the apparatus is unlikely to be in use. It should be noted that the US FDA Food Code (section 4-601-11 in particular), which is hereby incorporated by reference in the entirety, requires that a food apparatus of the type described herein be cleaned and/or sanitized every 4 hours. Aspects of the design in certain embodiments (e.g. the rinsing, cleaning and sanitizing systems) are expected to result in a variance from the FDA to allow sanitation only once every 24 hours, which greatly improves availability and acceptance of the commercial embodiments by retail institutions and consumers. In step 264, the temperature of the chamber (as increased by the injected steam) is measured until a thermister 136 in the lower area of the chamber registers a warm enough temperature (~175 F) to indicate that all parts of the chamber have reached a temperature sufficient to kill bacterial organisms. As seen in FIG. 8, the steam is provided at water shot and steam port 330E at the top of the chamber and the temperature is measured at the bottom of chamber 134 with thermister 136. By injecting steam at the top of the chamber and determining that the temperature near the bottom of the chamber has reached a sufficient temperature to kill bacteria, bacteria upon all surfaces within the chamber are ensured to be killed because the heated steam first fills the upper volume of the chamber and propagates from the top to the bottom due to its moist and heated condition making it lighter than the air it is displacing in the chamber.

While the injection temperature alone could be utilized, by also measuring that a given temperature has been achieved in the chamber, and then immediately stopping the steam injection, a shorter sanitation time is achieved while still ensuring killing of bacteria, thus making the apparatus available for further food production in a shorter period of time as compared to simply injecting steam at a given temperature for a preset duration.

FIG. 4A illustrates the apparatus with front door 124 opened. Product preparation chamber 134, also referred to as mixing chamber 134, can be seen within the upper portion of the apparatus. Although chamber 134 may be referred to as a mixing chamber, it should be understood, in certain of the described embodiments, that the product production involves boring through a frozen product, unlike what is typically referred to as a mixer. The front door opening of chamber 134 is sealed closed by inner chamber door seal 138 when front door 124 is in the closed position. Chamber 134 is also sealed when the bottom door 131 is closed. Bottom door 131 rotates about a hinge located at the side of the door and chamber in order to flip up and out of the way as the cup and holder are moved into the chamber. Bottom door 131 also incorporates a seal that ensures neither liquid nor steam escapes at the door locations. The doors 124 and 131 are sealed to the chamber when they are closed, effectively sealing the chamber during the steam sanitation cycle, thus allowing more quick and effective steam sanitation. Prior designs incorporated an open slot in the side wall of the chamber through which the cup holder mechanism traveled. While this open slot allowed a simpler and more vertically compact means of providing for cup travel up into the chamber, it stood as an impediment to effectively sealing the chamber for steaming, especially due to its location in the side of the chamber, and the tendency of steam to escape from the slot as it filled progressively from the top to the bottom of the chamber.

A consequence of sealing the chamber well is that the injected steam is unable to enter the chamber without increasing the pressure in the chamber. As seen in FIG. 8D, to alleviate this increased pressure, and to ensure that any escaping moisture from the steam does not reach any of the moisture sensitive electronic control components, a chamber vent hole 137A and connected chimney 137B are positioned adjacent the drain outlet, but still within the chamber. The chimney 137B extends upward to vent out the top of the apparatus, thus directing any moisture upward in the direction it naturally flows and out of the apparatus. The venting of steam from the bottom of the chamber through vent hole 137A and chimney 137B eliminates the need for a pressure relief valve because the steam can build up and fill the chamber without achieving a high pressure or relying on valve to be opened and closed.

A drain line 139 is also provided from the chamber in order to drain waste and rinse water from the chamber and out of the apparatus. This drain line is susceptible to growth of bacterial organisms which over time can grow and accumulate and clog the drain line. The bacteria may also migrate into the chamber, especially when the drain is clogged, which is especially problematic. This accumulation occurs most frequently at fittings in the drain line, which provide ready places for bacteria to grow. Therefore, the apparatus is provided with a flexible, bacteria resistant one piece extended drain line connected to the blending chamber outlet and running down and out through the back panel of the apparatus without any fittings. This line is provided with sufficient length to reach a drain proximate (within approximately 2 meters) to the installed location of the apparatus, all without any fittings.

In FIG. 4A, within chamber 134, cup lid weight 130 is shown in a tilted position. Cup 112 and carriage 108 are shown at a lower position. FIG. 4B illustrates cup 112 partially in mixing chamber 134, and cup lid weight 130 in a level position. Please note that the cup lid weight 130 is tilted when not supported by the cup, but that in FIG. 4B it is depicted as level, e.g. with a bottom surface parallel to the plane of the rim of the cup, for illustrative purposes to show the cup entering the chamber. Note that the tilt angle of the cup lid weight will be changed and the cup lid weight will be moved by the cup as it makes contact with the lid weight and lifts it off its support pin (described later). Cup lid weight 130 is a solid polymer based structure weighing about 4 or more pounds, for example 5.4 pounds in a preferred embodiment. Chamber 134 and cup lid weight 130 are preferably made of an unsaturated polyester in a thermoset process. The cup lid weight comprises a high density filler such as barium sulfate to create a high density and overall weight. In one embodiment the specific gravity of the cup lid weight is in the range of 2.5 to 3.5, for example 2.8.

The surface of the chamber walls and the cup lid weight is not smooth but is rather purposefully fabricated with a texture configured to aid in the release of food particles. The surface texture for the chamber walls and the cup lid weight is best achieved by acid etching the thermoset plastic to create a surface roughness of approximately 0.5-2.0 micron diameter protrusions, which are approximately 1-4 microns high, and are spaced approximately every 5-15 microns.

The cup lid weight 130, in addition to acting as a lid or splash guard, aids in preventing the cup from spinning when the rotating blade bores into the frozen material. The cup and the cup holder of the carriage have interlocking male/female features. The weight of the cup lid weight, provides a sufficient force to keep the mating surfaces of the interlocking features in contact with each other. For further information on the anti-rotation mechanisms, please refer to U.S. Pat. No. 6,041,961 entitled "CUP WITH ANTI-ROTATION MECHANISM" and U.S. patent application Ser. No. 12/265, 397 entitled "METHOD AND APPARATUS FOR ROTATIONALLY RESTRAINING A MIXING CONTAINER" which are hereby incorporated by reference in the entirety. As mentioned earlier, the cup weight also acts as a splash guard, keeping the blended food product within the cup during the boring and liquid injection phase.

FIGS. 5A-7B illustrate the cup lid weight 130 and associated boring components. Boring motor 146 is coupled to drive shaft 142, at the end of which is boring blade 150. Cup weight/lid 130 has an opening, through which drive shaft 142 passes. As seen in FIG. 5B, cup lid weight 130 may tilt about the axis of drive shaft 142. The ability to tilt allows greater access to the underside of the cup weight. The tilt angle is about 20-30 degrees and in one preferred embodiment is about 25 degrees. When a stream is directed upward from nozzle 330D of FIG. 8C from below the cup weight, with the cup weight in the tilted position, the stream can better reach the underside surface of the cup weight to dislodge food that may have been deposited upon the underside surface during blending because the underside of the cup weight is more exposed to the water stream and the water stream is less obstructed by the blending disc 150, which is located just below the cup weight. In one embodiment, as depicted in FIG. 5B, the water is provided at an angle 153 from the axis of shaft 142 so as to provide a direct path to and proper cleaning of the underside of the cup weight. Lower scour nozzle 330D (FIG. 8C) is located so as to achieve a delivery angle 153 of about 15 to 45 degrees.

Figure 6A:
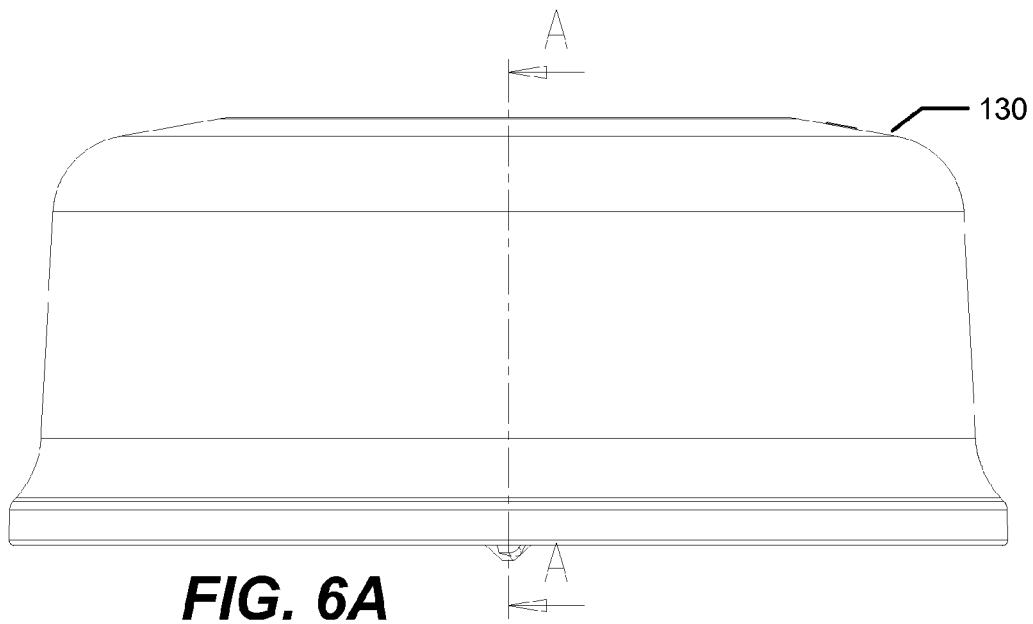
Figure 6B:
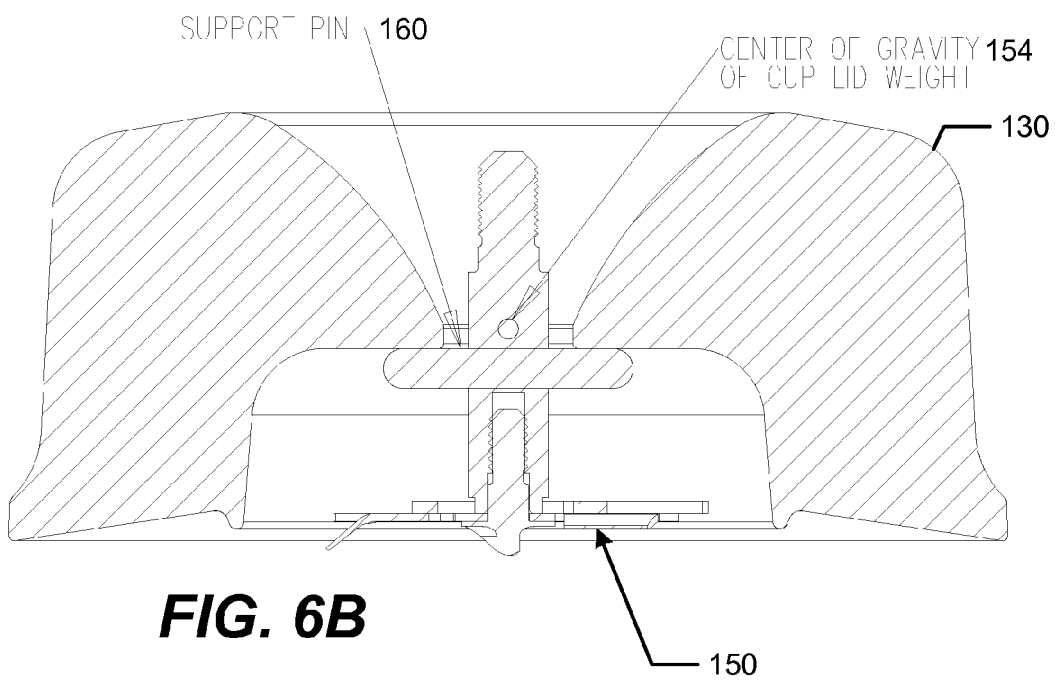
Figure 7A:
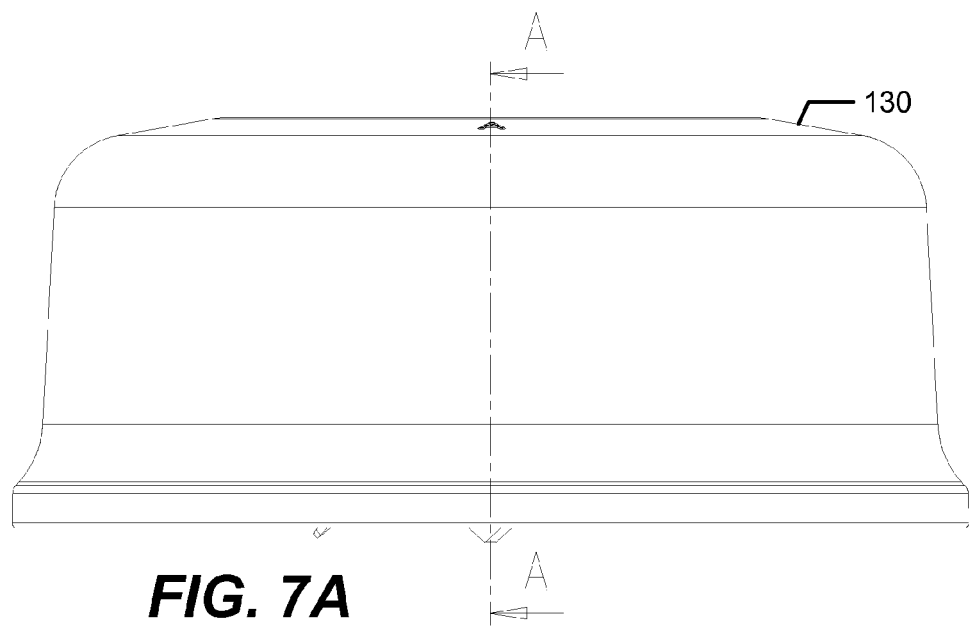
Figure 7B:
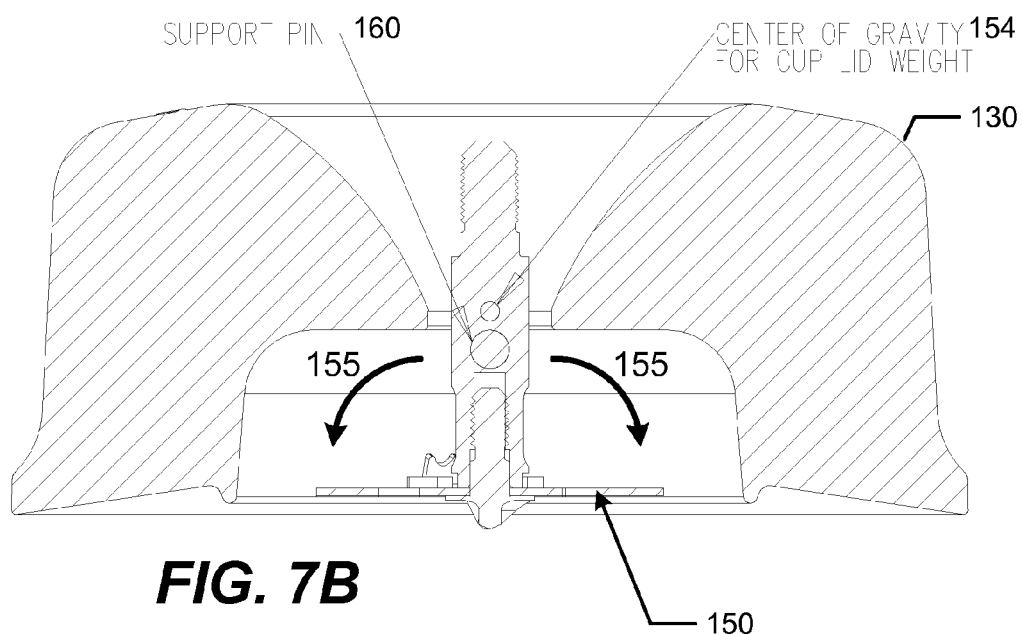

FIG. 6B is a cross section along line A-A of FIG. 6A. Cup lid weight 130 rests upon support pin 160 of (multi piece) drive shaft 142. In one embodiment, the cup lid weight 130 is designed so that the center of gravity 154 is located above the support pin 160. The inner diameter of the hole within the cup lid weight 130 is about 50-100% larger than the outer diameter of drive shaft 142, so that the cup lid weight may rotate about the support pin and tilt with respect to the drive shaft. Note that in some embodiments the center of gravity may also be below or at the level of the support pin, and the titling may be achieved by the rotational force alone or means of a tilted support pin, as allowed by the gap in outer/inner diameter of the shaft and cup lid weight respectively. FIG. 7B illustrates another cross section 90 degrees from that shown in FIG. 6B. The direction of tilting either clockwise or counterclockwise about support pin 160, as represented by arrows 155 is most clearly shown in FIG. 7B. By placing the center of gravity above the pin, tipping occurs randomly either clockwise or counterclockwise, thus improving the cleaning of the underside of the cup weight by more completely, randomly exposing all of the cup weight underside to the rinsing fluid from blending cycle to blending cycle.

Figure 8A:
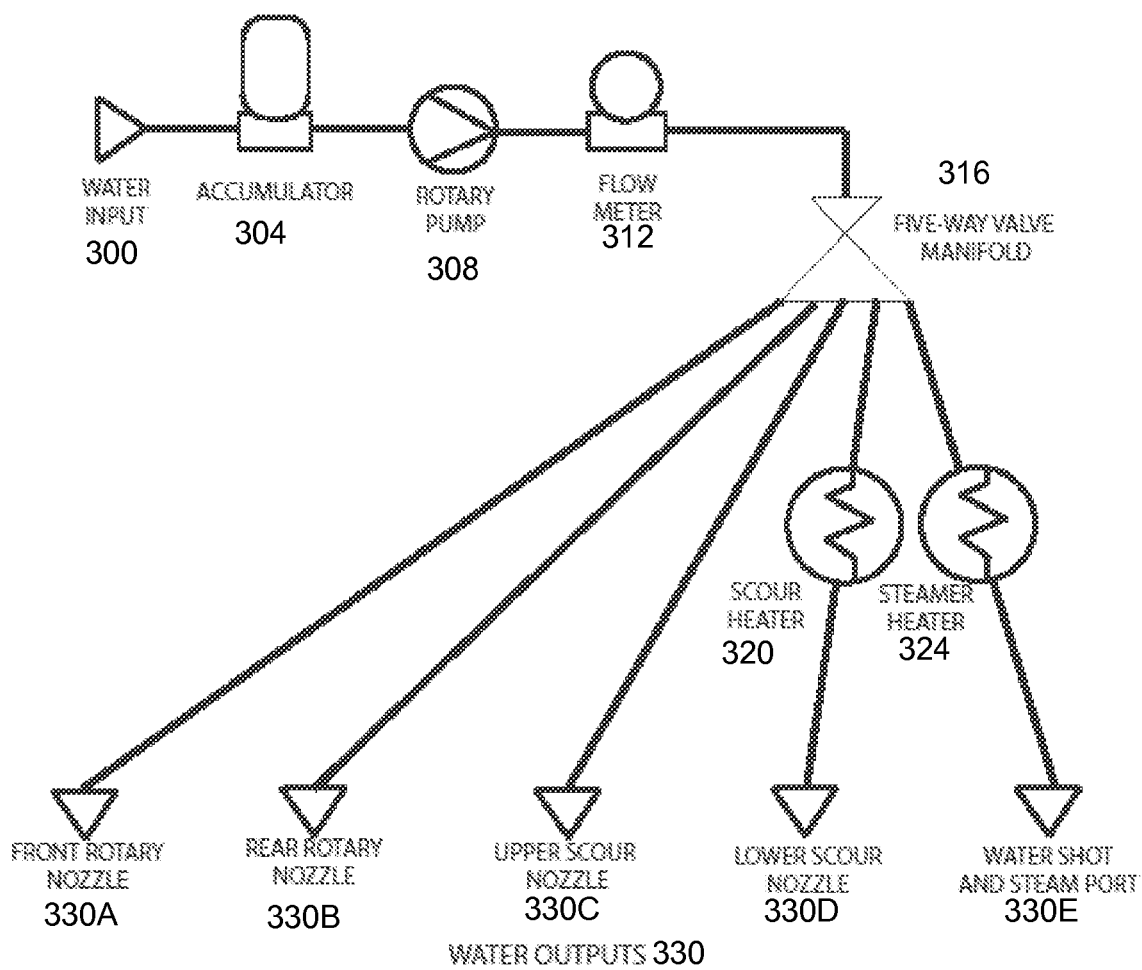
FIG. 8A is a schematic diagram of some components of a water delivery system of the apparatus.

FIG. 8A, touched upon earlier, is a plumbing diagram. Water input 300 is connected to a water supply line, which supplies water to accumulator 304 at the pressure of the incoming water supply. Rotary pump 308 increases the pressure and flow rate of the water as it is pumped from the accumulator through the flow meter 312 and valve manifold 316. As mentioned earlier, the increase in water pressure over input water supply line pressure is approximately 50-100 p.s.i. The flow rate through flow meter 312 may be used by control circuitry to alter the running time, flow rate and/or output pressure of pump 308. The control circuitry also uses the flow meter to measure and dispense precise amounts of liquid appropriate for various tasks. For example, a measured amount for a first size or consistency of milkshake may be different than for a second size or consistency. Amounts for scour nozzles and rotary nozzles are also measured by the flow meter. This improves upon prior designs utilizing an approximation of dispensed amounts (of e.g., water) based upon the elapsed time open of the valves, which is problematic when flow/pressure restrictions or variations arise. The valves of valve manifold 316 are activated by logic so as to supply one or more of: front rotary nozzle 330A; rear rotary nozzle 330B; upper scour nozzle 330C; lower scour nozzle 330D; and water shot and steam port 330E. Water passed to lower scour nozzle 330D is heated by scour heater 320. Water passed to water shot and steam port 330E is passed through steam heater 324. The heaters 320 and 324 may be discrete heaters and or may be different water passages through one heating element or core. In addition, steam heater 324 can serve as both a steam heater for steam sanitization of the apparatus and also can serve as the heater which heats water for addition to the milkshake during blending. By monitoring the temperature of heater 324, the water can be maintained at the approximately 125 degree Fahrenheit temperature desirable for addition to the milkshake, or when desired, steam can be created by running the heater at a temperature sufficiently high (approximately 225 degrees Fahrenheit) to generate steam. Because these two desired conditions do not occur simultaneously, these two functions can be combined into one heater, reducing the necessary heating units as well as the associated plumbing and valves.

Figure 8B:
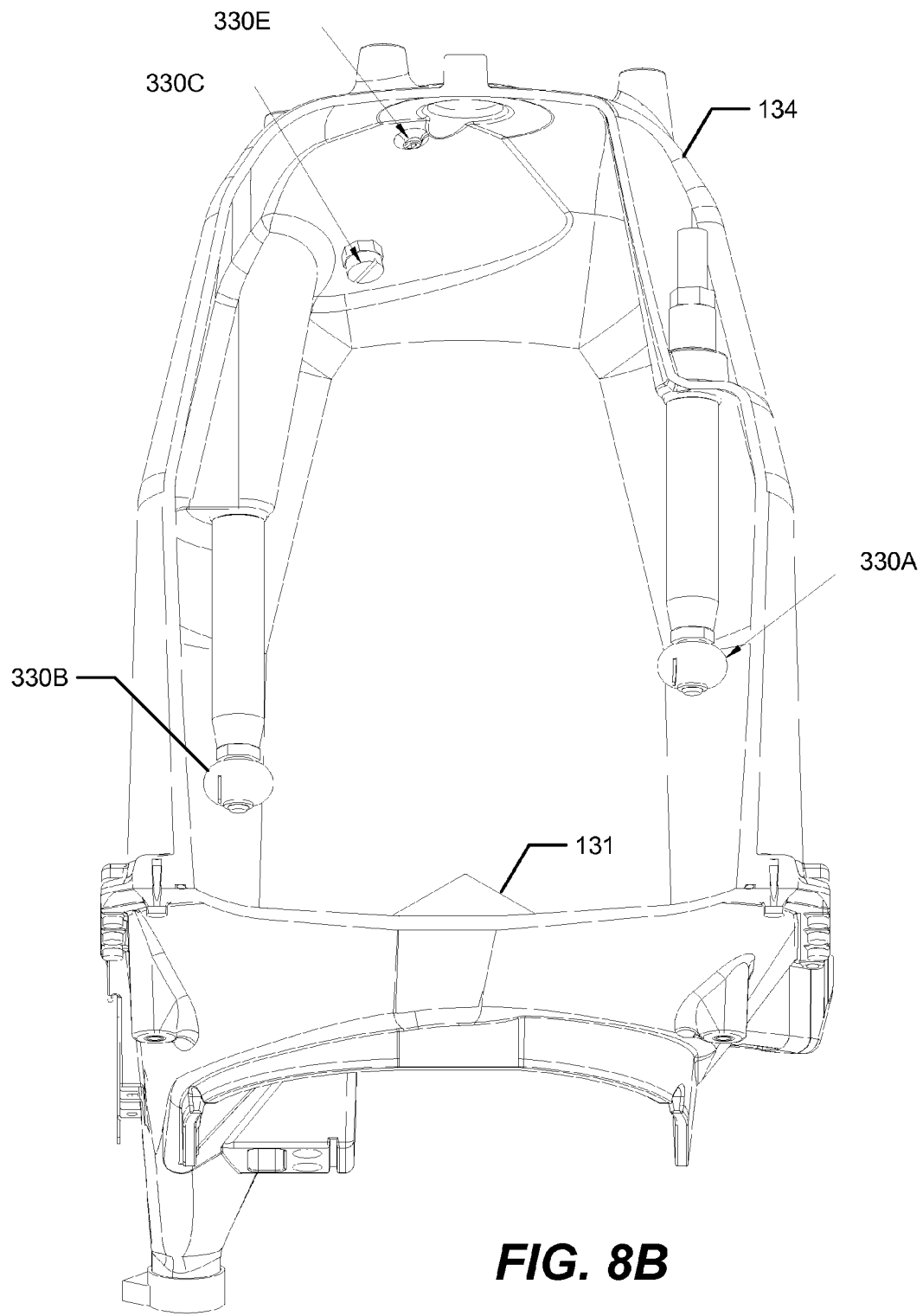
FIGS. 8B, 8C, and 8D illustrate a chamber and various components within the chamber.
Figure 8C:
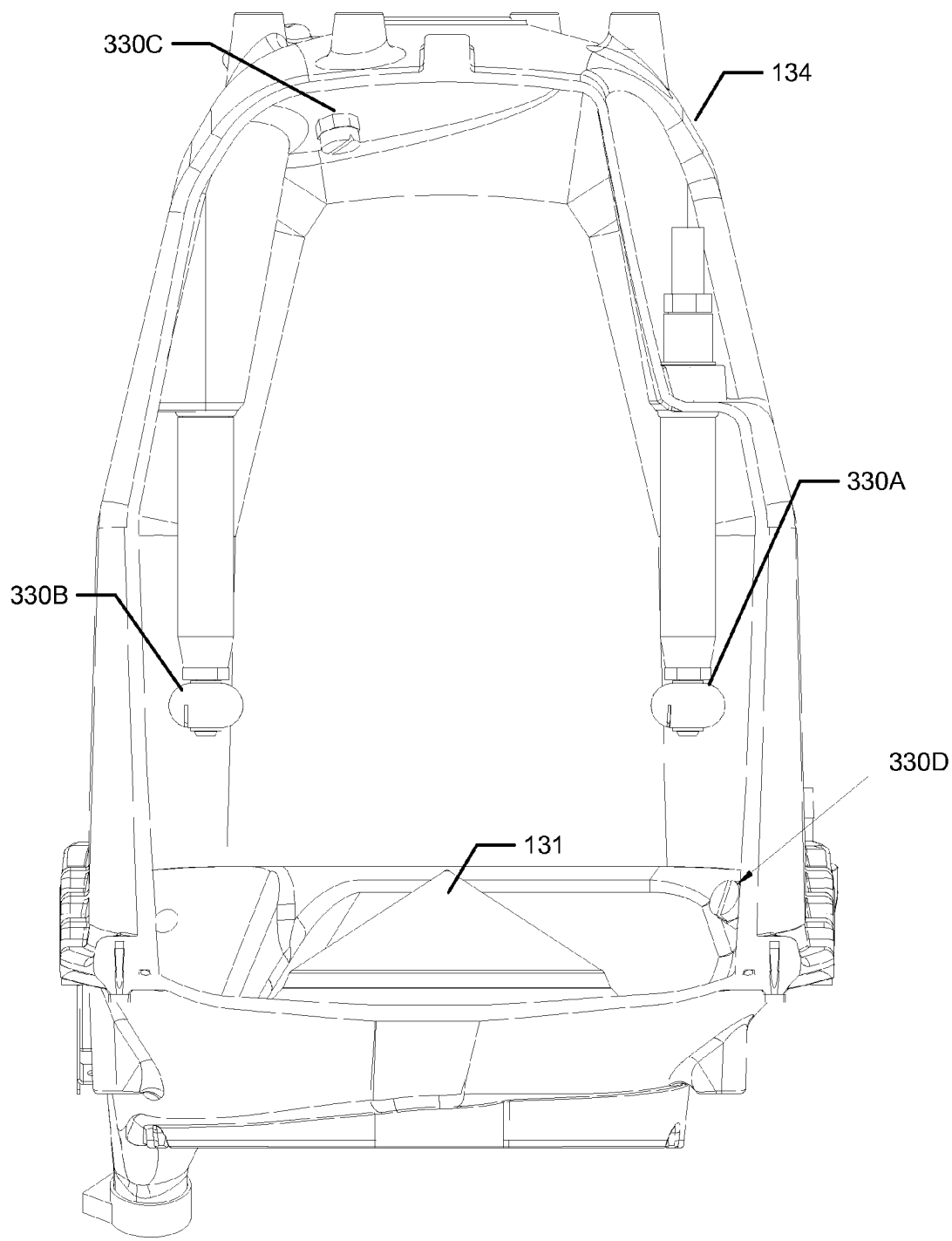
Figure 8D:
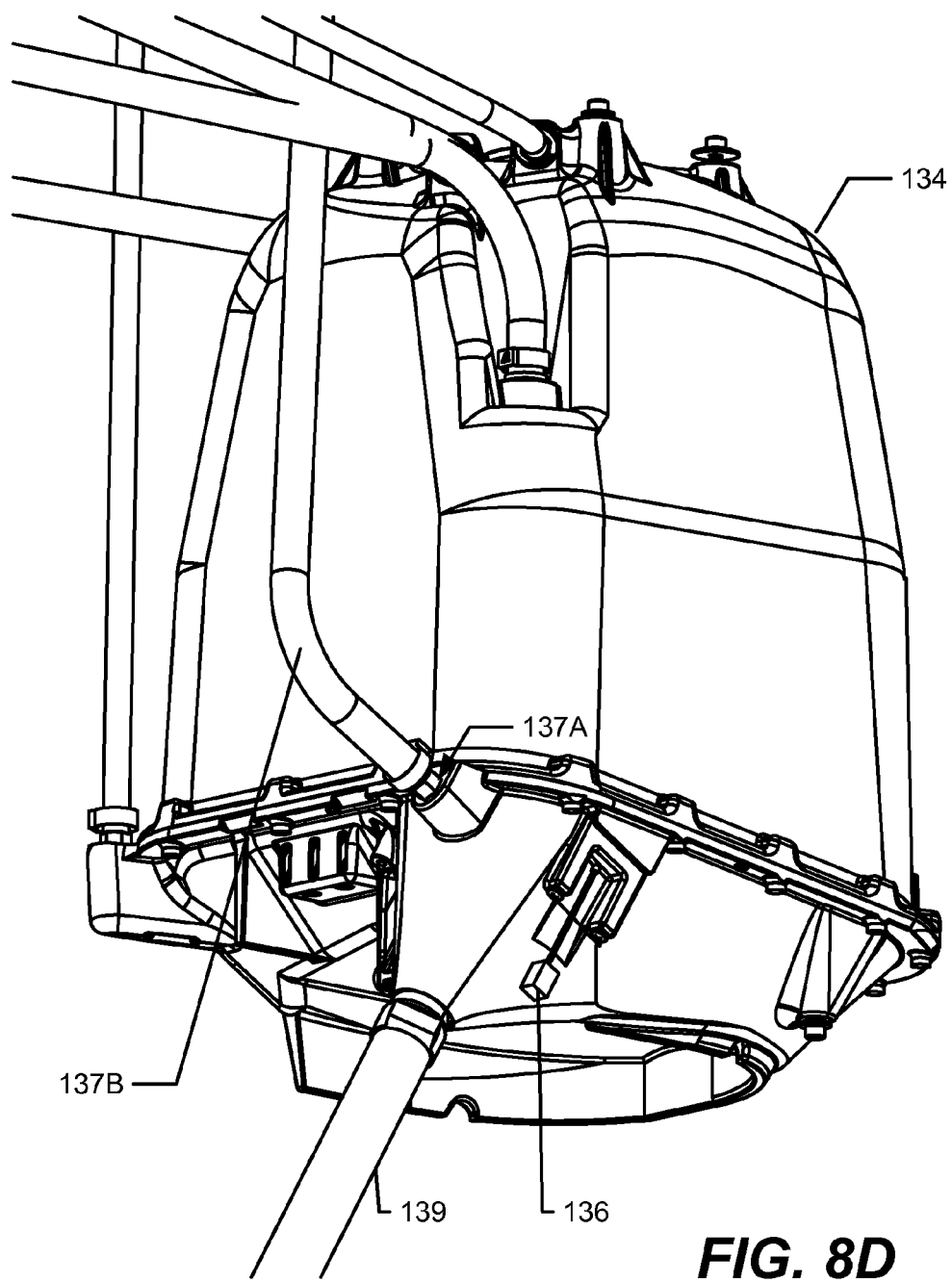

FIGS. 8B and 8C illustrate the chamber 134 and the various water dispensing components 330. As mentioned earlier, water shot nozzle and steam injection location 330E is located at the top of the blending chamber near the drive shaft and injects a shot of warm, e.g. approximately 125 degree Fahrenheit water into the cup during the boring of the product. After each production cycle, warm water is sprayed by the scour nozzles 330C and 330D in order to rinse any food residue off the food contact surfaces while the tipped cup lid weight 150 is slowly rotated.

If no product is run for an extended period, e.g. on the order of fifteen minutes, then the two rotary nozzles 330A and 330B are fired. A first nozzle is fired until the accumulator is nearly emptied, then the accumulator is refilled and the second nozzle is fired. This is to clear any splatters off of the chamber 134 walls. There are two nozzles to ensure there are no areas that are "shadowed" from both nozzles. With only one nozzle, this is difficult if not impossible.

A telecommunications transceiver may be incorporated into the apparatus. In one embodiment, the transceiver comprises a cellular modem that communicates over a "cellular" mobile telephone network, which eliminates any need for a wired connection. In another embodiment the transceiver comprises a wireless network or "wifi" modem operating under one or more of the 802.11 or other protocols. The modem may communicate with a remote monitoring facility to communicate various pertinent data about the apparatus. For example, any errors within the apparatus may be reported so that a technician can be sent to tend to the machine before the errors result in machine malfunction. For example, if the position verification system indicates that the belt has slipped, this condition may be reported and repaired. As another example, errors achieving necessary temperatures and pressures may be reported. As yet another example, a parameter that may be tracked and reported is motor current and/or time required to bore through a shake. A higher than normal motor current during shake preparation indicates that the freezer is colder than a baseline recommended temperature, or in other words too cold. A longer than usual elapsed time necessary to bore through the shake is also an indicator of an overly cold freezer, and similarly, a shorter than usual time may be indicative of a warmer than recommended freezer. Other parameters include but are not limited to the water pressure (as determined by the flow rate), cup presence, and line voltage supplied to the apparatus. Additionally, the sales volume of different sizes and types of products may be reported, and as a result inventory may be automatically restocked. Further, the food preparation apparatus is configured to allow the monitoring facility or other remote entity to disable the apparatus if certain product parameters or quantities are outside of expected or contracted ranges. The communication means can also be used to update the content of the user interface screen for new product information, or to provide new blending programs or parameters to blend newly developed products.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A food preparation apparatus comprising;
a chamber comprising a door which seals, the chamber when the door is in a closed position;
a carriage comprising a cup holder;
a motor that transports the carriage with the cup holder into the chamber from a starting position and returns the carriage to the starting position wherein said chamber door is opened when said carriage enters said chamber and closed after said carriage leaves said chamber; and
a cleaning system comprising a plurality of nozzles, a fluid reservoir and a fluid pump wherein, after said carriage leaves said chamber, pump pressurized fluid from said reservoir is sprayed into said chamber from said nozzles to clean said chamber.

2. The food preparation apparatus of claim 1, further comprising a flow meter to measure and dispense precise amounts of fluid.

3. The food preparation apparatus of claim 2, further comprising at least one fluid heater.

4. The food preparation apparatus of claim 3, wherein a fluid heater heats fluid to become steam.

5. The food preparation apparatus of claim 1, wherein said nozzles include both rotary nozzles and fixed nozzles.

6. The food preparation apparatus of claim 5, wherein fluid supplied to at least one of said fixed nozzles is heated.

7. The food preparation apparatus of claim 5, further comprising a manifold to distribute fluid to said rotary nozzles and said fixed nozzles.

8. The food preparation apparatus of claim 1, wherein said cupholder is capable of holding a cup with frozen food.

9. The food preparation apparatus of claim 8, further comprising a mixing blade.

10. The food preparation apparatus of claim 9, further comprising a lid that is placed over said cup during mixing.

11. The food preparation apparatus of claim 10, wherein said lid is connected to a rotary shaft which turns said mixing blade.

12. The food preparation apparatus of claim 11, wherein said lid tilts to allow it to be more easily cleaned when it is not in contact with said cup.

13. The food preparation apparatus of claim 8, wherein fluid from said reservoir is added to said frozen food as it is being mixed.

14. A food preparation apparatus comprising:
a chamber comprising a door at an underside of the chamber that seals the chamber when the door is in a closed position;
a carriage comprising a cup holder;
a motor that elevates the carriage and the cup holder into the sealed chamber from a starting position and returns the carriage to the starting position wherein said chamber door is opened when said carriage enters said chamber and closed after said carriage leaves said chamber; and
a cleaning system comprising a plurality of nozzles, a fluid reservoir, a fluid pump, a flow meter and at least one heater wherein, after said carriage leaves said chamber, a measured amount of heated and pump pressurized fluid from said reservoir is sprayed into said chamber from one or more of said nozzles to clean said chamber.

15. A food preparation apparatus comprising:
a chamber comprising a door at a lower portion of the chamber sealing to the chamber when the door is in a closed position;
a carriage comprising a cup holder;
a motor that elevates the carriage and a cup within the cup holder into the sealed chamber from a starting position and returns the carriage and cup to the starting position; and
a water delivery system that dispenses water into the cup as a blade mixes a product within the cup during a food preparation cycle,
the water delivery system further comprising one or more fixed scouring nozzles to automatically deliver water to an underside of a weighted cup lid following each preparation cycle when the door of the chamber is in a closed, sealed position and one or more rotary nozzles configured to spray water on walls of the chamber.

16. The food preparation apparatus of claim 15, wherein the water delivery system is further configured to activate and dispense water from a first rotary nozzle after a threshold period of time since a previous cleansing of the chamber has been met or exceeded.

17. The food preparation apparatus of claim 16, wherein the water delivery system is further configured to refill a water reservoir coupled to the first rotary nozzle after said rotary nozzle has dispensed the water.

18. The food preparation apparatus of claim 17, wherein the water delivery system is further configured to activate and dispense water from a second rotary nozzle after the reservoir has been refilled.

19. The food preparation apparatus of claim 15, wherein the water delivery system further comprises a reservoir and a pump located upstream of the one or more rotary nozzles, the reservoir sized to provide a water supply sufficient to allow the nozzles to dispense water at a rate of 3-5 gallons per minute for 1-3 seconds.

20. The food preparation apparatus of claim 19, wherein the pump is located between the reservoir and the one or more nozzles.

21. The food preparation apparatus of claim 15, further comprising a heater for heating the water that is dispensed into the cup.

22. The food preparation apparatus of claim 21, wherein the apparatus is configured to utilize the heater to generate steam for sanitizing the apparatus.

23. The food preparation apparatus of claim 22, wherein the heater is controlled to heat water up to 235 degrees Fahrenheit.

24. The food preparation apparatus of claim 23 wherein the apparatus comprises
- a water line to deliver both the water dispensed into the cup and the steam used to sanitize the chamber.

25. A food preparation apparatus comprising:
- a chamber comprising a door at a lower portion of the chamber that seals the chamber when the door is in a closed position
- a carriage comprising a cup holder;
- a motor that elevates the carriage and a cup within the cup holder into the sealed chamber from a starting position and returns the carriage and cup to the starting position;
- a first set of nozzles within the chamber configured to spray water in a fixed position onto the inside of said chamber; and
- a second set of nozzles within the chamber comprising at least one rotary nozzle to spray water in a rotating pattern,
- wherein the apparatus is configured to activate the first and second set of nozzles when the chamber door is in a closed, sealed position.

26. A food preparation apparatus comprising:
- a food preparation chamber which can be sealed for cleaning after food is prepared in the chamber and removed; and,
- a cleaning system to clean the interior of the food preparation chamber after sealing comprising a fluid reservoir, a fluid pump, a flow meter and a plurality of nozzles such that a measured amount of pump pressurized fluid from said reservoir can be sprayed by said nozzles to clean the interior of said food preparation chamber.

27. The food preparation apparatus of claim 26 further comprising a heater to allow one or more of said nozzles to spray heated cleaning fluid.

28. The food preparation apparatus of claim 27 wherein said fluid is water and said heater is capable of heating said water until it becomes steam.

29. The food preparation apparatus of claim 28 further including a steam port.

30. The food preparation apparatus of claim 26 wherein said nozzles include both fixed nozzles and rotary nozzles.

31. The food preparation apparatus of claim 26 further including a manifold to distribute fluid to said nozzles.

* * * * *